(12) United States Patent
McCann et al.

(10) Patent No.: US 10,873,842 B2
(45) Date of Patent: Dec. 22, 2020

(54) MANAGED OBJECT TO PROVISION A DEVICE ACCORDING TO ONE OF PLURAL PROVISIONING TECHNIQUES

(71) Applicant: BlackBerry Limited, Waterloo (CA)

(72) Inventors: Stephen McCann, Southampton (GB); Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 160 days.

(21) Appl. No.: 15/094,819

(22) Filed: Apr. 8, 2016

(65) Prior Publication Data
US 2017/0295448 A1    Oct. 12, 2017

(51) Int. Cl.
| | | |
|---|---|---|
| *G06F 7/04* | (2006.01) |
| *G06F 15/16* | (2006.01) |
| *H04L 29/06* | (2006.01) |
| *H04W 4/50* | (2018.01) |
| *H04W 12/00* | (2009.01) |
| *H04W 8/00* | (2009.01) |
| *H04W 12/04* | (2009.01) |
| *H04W 12/06* | (2009.01) |
| *H04W 84/12* | (2009.01) |

(52) U.S. Cl.
CPC ............ *H04W 4/50* (2018.02); *H04L 63/06* (2013.01); *H04L 63/08* (2013.01); *H04W 8/005* (2013.01); *H04W 12/003* (2019.01); *H04W 12/0023* (2019.01); *H04W 12/04* (2013.01); *H04W 12/06* (2013.01); *H04L 63/062* (2013.01); *H04W 84/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,037,305 | B2 * | 10/2011 | Rahman ................ | H04L 63/162 713/168 |
| 8,149,847 | B2 | 4/2012 | Siripunkaw et al. | |
| 8,619,735 | B2 | 12/2013 | Montemurro et al. | |
| 9,137,808 | B2 | 9/2015 | Pearson et al. | |
| 9,736,801 | B1 * | 8/2017 | Lambert ............... | H04W 56/00 |
| 10,609,581 | B2 * | 3/2020 | Lee ........................ | H04W 12/08 |
| 2008/0292101 | A1 * | 11/2008 | Macchi ............... | H04L 63/0428 380/270 |
| 2009/0150665 | A1 * | 6/2009 | Kaippallimalil ...... | H04L 63/062 713/153 |
| 2011/0219427 | A1 * | 9/2011 | Hito ....................... | G06F 21/00 726/3 |

(Continued)

OTHER PUBLICATIONS

"Sankalp Sunil, Adwitiya Mukhopdadhyay, Chandan Gujjar, Multi-group message communication on android smartphones via WiFidirect, Sep. 13-16, 2017, IEEE, INSPEC# 17414738" (Year: 2017).*

(Continued)

*Primary Examiner* — Phy Anh T Vu
(74) *Attorney, Agent, or Firm* — Trop, Pruner & Hu, P.C.

(57) ABSTRACT

A wireless device receives, from a configurator device, a managed object that includes information indicating which of different provisioning techniques is to be used to provision the wireless device. The wireless device determines, based on the information, a particular provisioning technique of the different provisioning techniques to use.

16 Claims, 6 Drawing Sheets

(56) References Cited

U.S. PATENT DOCUMENTS

| | | | | |
|---|---|---|---|---|
| 2013/0042115 | A1* | 2/2013 | Sweet | H04L 63/0428 713/176 |
| 2013/0232561 | A1 | 9/2013 | Gupta | |
| 2014/0195807 | A1* | 7/2014 | Bar-El | H04L 9/0877 713/168 |
| 2015/0180978 | A1* | 6/2015 | Canpolat | H04L 5/0092 370/329 |
| 2015/0229475 | A1* | 8/2015 | Benoit | H04L 9/14 713/168 |
| 2015/0256627 | A1* | 9/2015 | Patil | H04L 67/141 709/228 |
| 2016/0128113 | A1* | 5/2016 | Qi | H04W 8/005 370/329 |
| 2016/0182459 | A1* | 6/2016 | Britt | H04L 67/12 713/171 |
| 2016/0277370 | A1* | 9/2016 | Lee | H04W 12/0023 |
| 2017/0006117 | A1* | 1/2017 | Kafle | H04W 76/11 |
| 2017/0257819 | A1* | 9/2017 | McCann | H04W 48/14 |
| 2018/0146450 | A1* | 5/2018 | Li | H04W 8/005 |
| 2018/0316562 | A1* | 11/2018 | Lepp | H04L 41/0893 |
| 2019/0014531 | A1* | 1/2019 | Fang | H04L 29/12 |
| 2019/0380034 | A1* | 12/2019 | Montemurro | H04W 12/0802 |

OTHER PUBLICATIONS

"Kyuchang Kang, Jeunwoo Lee, Hoon Choi, Device Detection and Driver Provisioning Mechanism for Small Devices, Feb. 12-14, 2007, IEEE, INSPEC#9518449" (Year: 2007).*

Canadian Intellectual Property Office, International Search Report and Written Opinion for PCT/CA2017/050427 dated Jul. 21, 2017 (7 pages).

Wi-Fi Alliance, Wi-Fi Certified Passpoint, Hotspot 2.0 (Release 2) Technical Specification, Version 1.0.0, "A Solution for Next Generation Wi-Fi Hotspots"; 2014; 207 pages.

IEEE, Standard for Information Technology—Telecommunications and Information Exchange Between Systems Local and Metropolitan area networks—Specific Requirements; Part 11: "Wireless LAN Medium Access control (MAC) and Physical Layer (PHY) Specifications"; 2012; 2,793 pages.

Wikipedia; "Captive Portal"; https://web.archive.org/web/20150202195543/https://en.wikipedia.org/wiki/Captive_portal; Feb. 2, 2015; 6 pages.

Stephen McCann et al., U.S. Appl. No. 14/794,191 entitled Link Indication Referring to Content for Presenting at a Mobile Device filed Jul. 8, 2015 (44 pages).

3GPP TS 24.234 V12.2.0 Technical Specification 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 12) Mar. 2015 (40 pages).

WiFi Alliance (http://www.wi-fi.org/who-we-are/current-work-areas) Who We Are—Current Work Areas—Early Devleopment, Applications Service Platform 2.0 downloaded Mar. 2, 2016 (7 pages).

WIKI—(https://wiki.iotivity.org/multi-phy_easy_setup) Lotivity—Multi-Phy Easy Setup last modified Jan. 21, 2016 (7 pages).

WiFi Alliance (http://www.wi-fi.org/certification/programs) Certification—Programs downloaded Mar. 2, 2016 4 pages).

WiFi Alliance (http://www.wi-fi.org/news-events/newsroom/wi-fi-alliance-announces-certification-plans-for-ieee-80211g-wireless-lan) Wi-Fi Alliance Announces Certification Plans for IEEE 802.11g Wireless LAN Products, Feb. 25, 2003 (3 pages).

McCann et al., U.S. Appl. No. 15/058,545 entitled Provisioning a Device in a Network filed Mar. 2, 2016 (38 pages).

Akin, Devin, 802.11i Authentication and Key Management (AKM) White Paper, May 2005 (10 pages).

WiFi Alliance, Discover Wi-Fi—Wi-Fi Protected Setup downloaded Apr. 6, 2016 (4 pages).

WiFi Alliance, Draft, Wi-Fi Device Provisioning Protocol (DPP) Technical Specification, Version 0.0.11, Mar. 22, 2016 (59 pages).

WiFi Alliance, Draft, Wi-Fi Neighbor Awareness Networking (NAN) Technical Specification, Version 1.0 r07, Jan. 18, 2016 (156 pages).

WiFi Alliance, Wi-Fi Simple Configuration Protocol and Usability Best Practices for the Wi-Fi Protected Setup™ Program, Version 2.0.1, Apr. 2011 (30 pages).

European Patent Office, Extended European Search Report for Appl. No. 17778523.5 dated Sep. 4, 2019 (10 pages).

WiFi Alliance, Wi-Fi Simple Configuration Technical Specification, Version 2.0.2, Change Headless Devices section to mandate implementation of strong mitigation against a brute force attack on the AP that uses a static PIN, Jan. 30, 2012 (154 pages).

* cited by examiner

MANAGED OBJECT TO PROVISION A DEVICE ACCORDING TO ONE OF PLURAL PROVISIONING TECHNIQUES

BACKGROUND

A wireless device can connect to a wireless network to perform communications with other endpoints. In some cases, before a wireless device can utilize a wireless network to perform communications, the wireless device has to be first provisioned with information to allow the wireless device to connect to the wireless network. In some examples, the provisioning can include providing the wireless device with security credentials that can be used by the wireless device to the wireless network.

BRIEF DESCRIPTION OF THE DRAWINGS

Some implementations of the present disclosure are described with respect to the following figures.

DETAILED DESCRIPTION

Generally, "provisioning" a wireless device can refer to providing the wireless device with specific information to allow the wireless device to establish connectivity with a wireless network so that the wireless device can perform communications through the wireless network with another endpoint. In some examples, the specific information that is provided to a wireless device as part of the provisioning process includes security credentials, such as in the form of user names and passwords, encryption keys, or other credentials. Such security credentials can be used by the wireless device to securely connect to the wireless network. In further examples, the security credentials can be used by the wireless device to perform an automated login procedure to the wireless network.

In the present disclosure, "provisioning" a wireless device can refer to the initial provisioning of the wireless device, or alternatively, to re-provisioning the wireless device (to change provisioning parameters) after the wireless device has been initially provisioned.

A "wireless device" can refer to any type of electronic device that uses wireless communications. As examples, a wireless device can include any of the following: a portable computer, a smart phone, a tablet computer, a game appliance, a personal digital assistant (PDA), a wearable device (e.g. a smart watch, smart eyeglasses, etc.), a desktop computer, a vehicle (or an electronic device in a vehicle), a health monitor, and so forth.

Wireless devices can connect to other devices, such as access points (APs) or peer-to-peer (P2P) Group Owners, to obtain network connectivity. In some examples, within a wireless local area network (WLAN), wireless devices are able to establish wireless links with one or more APs. According to the Institute of Electronics and Electrical Engineers (IEEE) 802.11 protocol, an AP can be referred to as an AP STA (short for "station"). Wireless devices that communicate using the AP can be referred to as a non-AP STA. Although reference is made to the IEEE 802.11 protocol in some examples, it is noted that communications in a wireless network with APs (more generally wireless access nodes) can operate according to other protocols in other examples.

In further examples, wireless network connectivity can be according to Wi-Fi Direct, which provides a mechanism for a P2P network to be built on top of the IEEE 802.11 WLAN protocols. Wi-Fi Direct is specified by standards provided by the Wi-Fi Alliance (WFA). An arrangement of wireless devices that are able to communicate according to Wi-Fi Direct includes a P2P Group Owner (GO) and P2P client devices. The GO operates as an AP, while the client devices operate as non-AP STAs. The differences from regular IEEE 802.11/Wi-Fi are the discovery and group formation procedures. Once the group is operating, the operation of the group is similar to operation according to IEEE 802.11 in which a traditional AP is used.

In some examples, provisioning of a wireless device can proceed according to Hotspot 2.0 as described in Wi-Fi Alliance Hotspot 2.0 Release 2, Technical Specification, Version 1.0.0, August 2014. Hotspot 2.0 is also referred to as the Wi-Fi Alliance Passpoint Program. Hotspot 2.0 can refer to a version of Hotspot 2.0 as described in the above Specification, or by later releases.

In other examples, instead of using Hotspot 2.0 to perform provisioning of a wireless device, provisioning of a wireless device can occur according to the Wi-Fi Alliance Device Provisioning Protocol (DPP). DPP provides a provisioning scheme in which a fixed network infrastructure to provide provisioning of wireless devices does not have to be provided. By using DPP, use of certain servers, such as an Authentication, Authorization, and Accounting (AAA) server, a policy database, a web server, and/or other network infrastructure entities can be avoided.

DPP can use a pair of public and private keys between devices to perform provisioning over a secure channel established using the keys. DPP does not have to rely on use of network servers. The keys are used to encrypt and decrypt data exchanged between a DPP configurator and a wireless device to be provisioned.

DPP uses a configurator device (which is a gatekeeper) to provision other devices (enrollee devices) within a network, where the enrollee devices can include stations such as mobile devices or other user devices, access points (APs), peer-to-peer (P2P) client devices, P2P GOs, P2P services client devices, Neighbor Awareness Networking (NAN) devices, or other types of devices. Any of a station, AP, or other device can also operate as a configurator device (referred to as a "DPP configurator"). Devices that have yet to be configured by the DPP configurator are called enrollee devices, and devices that have been configured by the DPP configurator are called peers. An AP is a special type of peer. Generally, a "configurator device" can refer to any wireless device (e.g. a mobile device or an AP) in which an application or service is executed that is able to perform provisioning functionality.

DPP operates between a pair of devices, where a first device takes on the role of configurator and the second device takes on the role of enrollee. Either device can initiate DPP provisioning—the device that initiates the DPP provisioning can be referred to as an initiator device, while the device that responds to the initiation can be referred to as a responder device. Roles can be assumed by an initiator device (a device used to initiate DPP authentication) and a responder device, based upon the type of network that DPP is being used to set up. It is also possible for a first configurator device to provision an enrollee as another configurator, for example in the situation where the first configurator has to move away to another location.

Although reference is made to provisioning techniques according to Hotspot 2.0 or DPP, it is noted that in further examples, additional or alternative provisioning techniques can also be employed, such as a provisioning technique provided for Neighbor Awareness Networking (NAN). NAN relies on communication among wireless devices that are in close proximity.

A current version of DPP does not specify any detailed parameters relating to provisioning of wireless devices as part of the DPP provisioning process. Also, DPP provisioning processes currently do not support provisioning of wireless devices that do not support DPP (such wireless devices can be referred to as legacy wireless devices, such as those that operate according to Hotspot 2.0). Thus, there is no backward compatibility between DPP and a different provisioning technique, such as the Hotspot 2.0 provisioning technique. Moreover, there is no specific technique currently proposed for configuring a wireless device as a DPP configurator.

In accordance with some implementations of the present disclosure, a common managed object (CMO) can be used that is capable of carrying different information for respective different provisioning techniques. As a result, the CMO can be used to support different types of provisioning techniques, including a Hotspot 2.0 provisioning technique, a DPP provisioning technique, a NAN provisioning technique, or any other type of provisioning technique. The CMO is a unified configuration data structure with nodes and fields (more generally, "information elements") that can include information for performing a corresponding provisioning technique.

Performing Provisioning Using a CMO

Figure 1:
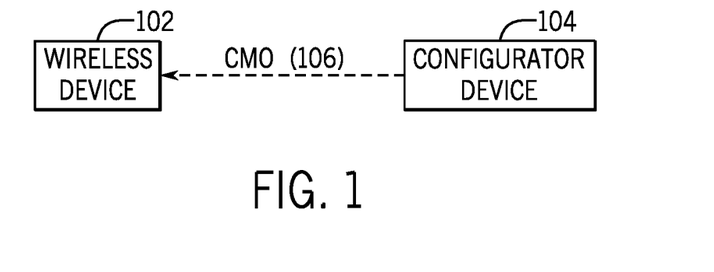
FIG. 1 is a block diagram of an example network arrangement according to some implementations.

FIG. 1 is a block diagram of an example network arrangement that includes a wireless device 102 (which is to be provisioned) and a configurator device 104 (which can be used to provision the wireless device 102). The wireless device 102 that is to be provisioned can also be referred to as a client device. In some examples, the configurator device 104 can be a DPP configurator that is able to support any of several different types of provisioning techniques (e.g. DPP, Hotspot 2.0, NAN, etc.).

For purposes of performing Hotspot 2.0 provisioning, the configurator device 104 can take on the role of a provisioning server. According to Hotspot 2.0, the provisioning server is an Online Sign Up (OSU) server. OSU, as provided by Hotspot 2.0, is a process by which a wireless device registers with a service provider or a Hotspot operator, to enable a user to obtain network access. The OSU process includes provisioning of a wireless device with security credentials and policy parameters.

In accordance with some implementations of the present disclosure, the configurator device 104 is able to send a CMO 106 to the wireless device 102 that is to be provisioned. As noted further above, "provisioning" a wireless device can refer to initially provisioning the wireless device or re-provisioning the wireless device.

In the ensuing discussion, reference is made to DPP provisioning and Hotspot 2.0 provisioning as examples of different types of provisioning techniques. It is noted that in other examples, other types of provisioning techniques in addition to or in place of DPP or Hotspot 2.0 provisioning can be employed.

The CMO 106 is capable of including DPP specific parameters and Hotspot 2.0 specific parameters. For example, DPP provisioning employs key credentials that are not used by Hotspot 2.0. To provide backward compatibility with Hotspot 2.0 provisioning mechanisms, it is useful to have DPP information elements in the CMO 106 in addition to information elements that contain information for Hotspot 2.0. A Hotspot 2.0 wireless device is able to process the CMO 106 in one way, while a DPP wireless device can process the CMO 106 in a different way.

A CMO according to some implementations can include information elements that are present in the Hotspot 2.0 Subscription Managed Object (MO) that contains subscription and policy specific parameters supporting SP subscriptions. In some examples, the Hotspot 2.0 MO is defined according to the Open Mobile Alliance (OMA) Mobile Terminal Management Tree and Descriptions Specification. In other examples, the Hotspot 2.0 MO is defined using Extensible Markup Language (XML) and is transported using a Simple Object Access Protocol (SOAP).

In addition to the information elements present in the Hotspot 2.0 MO, a CMO according to some implementations can include additional information elements that relate to DPP provisioning. By including specific logic in the CMO, the CMO can be used either for Hotspot 2.0 provisioning or DPP provisioning or other provisioning methods. Such specific logic in the CMO for indicating which provisioning (e.g. Hotspot 2.0 or DPP) is to be employed can be in the form of predetermined information in the CMO.

For example, if the predetermined information in the CMO includes a particular information element (referred to as the "Wi-Fi Technology" information element in some examples) that is set to a specific value, and does not include an information element (e.g. a node) corresponding to a Hotspot 2.0 provisioning server, then that indicates that DPP provisioning is to be performed using the information in the CMO.

On the other hand, if the predetermined information in the CMO does not include the Wi-Fi Technology information element but includes the information element corresponding to a Hotspot 2.0 provisioning server, then that indicates that Hotspot 2.0 provisioning is to be performed using the information in the CMO. The Wi-Fi Technology information element is also referred to as the "Connector".

In other examples, the predetermined information in the CMO for indicating which of multiple different types of provisioning techniques is to be used can have other forms—for example, the predetermined information can include an information element that is settable to any of multiple different values to indicate respective different provisioning techniques to use.

More generally, a collection of provisioning information elements populated in the managed object depends upon which of different provisioning techniques is to be used to provision the wireless device 102, where different collections of provisioning information elements correspond to the different provisioning techniques. If the wireless device 102 is to be provisioned according to a first provisioning technique, then the CMO 106 can be populated with information elements pertaining to the first provisioning technique, while information elements that relate to a second provisioning technique can be omitted from the CMO 106 or alternatively can have invalid or null values. Similarly, if the wireless device 102 is to be provisioned according to the second provisioning technique, then the CMO 106 can be populated with information elements pertaining to the second provisioning technique, while information elements that relate to the first provisioning technique can be omitted from the CMO 106 or alternatively can have invalid or null values The wireless device 102 is able to parse the predetermined information in the CMO 106 to determine which of multiple different provisioning techniques to use. In some examples, the wireless device 102 is able to select one provisioning technique from the multiple different provisioning techniques to use for provisioning the wireless device 102. In other examples, the wireless device 102 is a legacy wireless device, which is able to support provisioning according to a single specific provisioning technique, e.g. the Hotspot 2.0 provisioning technique. In such examples, the legacy wireless device 102 would just process the information elements in the CMO 106 that are Hotspot 2.0 information elements, while ignoring any remaining information elements in the CMO 106 that are DPP information elements.

With DPP provisioning, the wireless device 102 and the configurator device 104 can communicate directly with each other over a wireless link without passing through a wireless access node such as an AP. However, if Hotspot 2.0 provisioning is performed, then the communication between the wireless device 102 and the configurator device 104 would pass through an AP.

Figure 2:
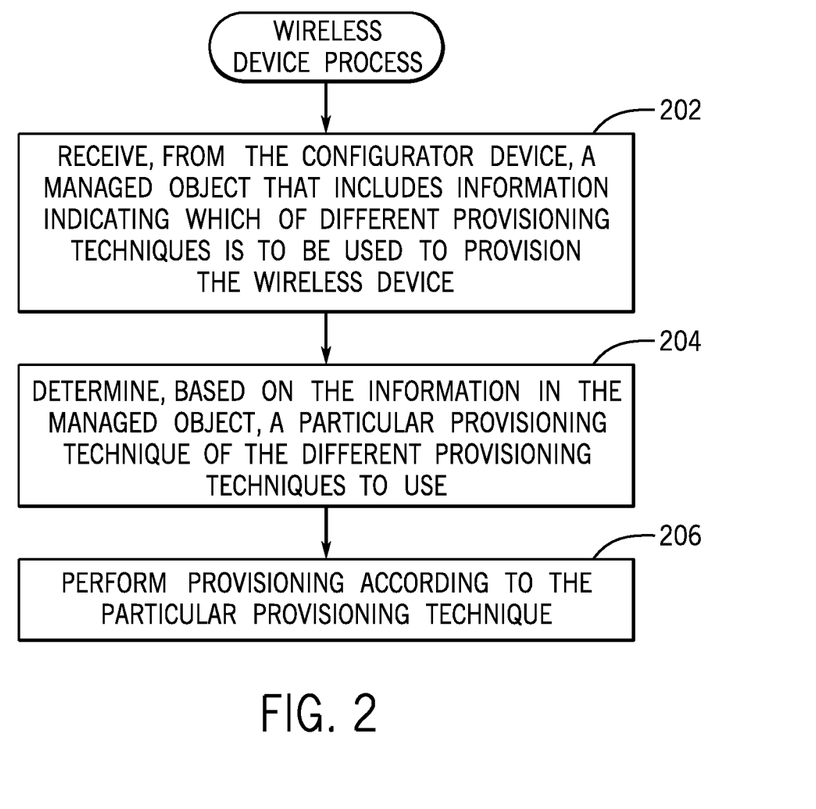
FIG. 2 is a flow diagram of an example process according to some implementations.

FIG. 2 is a flow diagram of an example process that can be performed by the wireless device 102 that is to be provisioned, in accordance with some implementations. The wireless device 102 receives (at 202), from the configurator device 104, a managed object (e.g. the CMO 106 in FIG. 1) that includes information indicating which of different provisioning techniques is to be used to provision the wireless device 102.

The wireless device 102 determines (at 204), based on the information in the managed object, a particular provisioning technique of the different provisioning techniques to use. The wireless device 102 performs (at 206) provisioning according to the particular provisioning technique.

Figure 3:
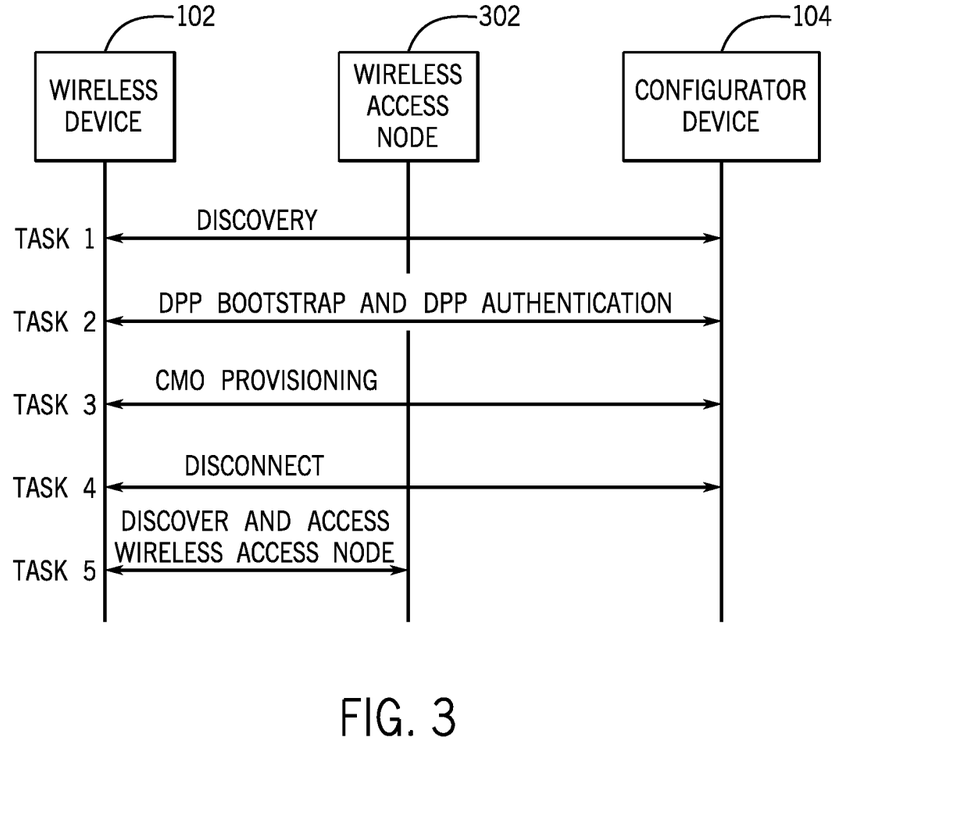
FIG. 3 is a flow diagram of an example process according to further implementations.

FIG. 3 is a message flow diagram of a process to perform provisioning of the wireless device 102 and the configurator device 104 according to some implementations. FIG. 3 shows various tasks, labeled task 1, task 2, task 3, task 4, and task 5. In task 1, the wireless device 102 discovers the existence of the configurator device 104 using various techniques, such as based on detecting a quick response (QR) code of the configurator device 104, detecting the configurator device 104 using near field communications (NFC), or establishing a Wi-Fi Direct link with the configurator device 104. In task 2, the wireless device 102 and the configurator device 104 can perform DPP bootstrapping and DPP authentication. DPP bootstrapping involves the configurator device 104 obtaining bootstrapping information from the wireless device 102, where the bootstrapping information can include an enrollee bootstrapping public key and information relating to discovery information for performing DPP authentication. DPP authentication involves the DPP configurator device 104 sending a DPP Authentication Request to the wireless device 102, which responds with a DPP Authentication Response. The DPP authentication allows the configurator device 104 and the wireless device 102 to validate each other.

In task 3, based on information exchanged in tasks 1 and 2, the configurator device 104 decides which Wi-Fi Technology is being used for the wireless interface between the configurator device 104 and the wireless device 102. The Wi-Fi Technology can either be the DPP technology or another technology. If Hotspot 2.0 technology is to be used, the Wi-Fi Technology node is absent and the "Home SP" node is used instead. This provides legacy support for Hotspot 2.0 devices. The configurator device 104 can then include information in the CMO for indicating to the wireless device 102 which Wi-Fi Technology or whether Hotspot 2.0 is to be used for provisioning. Provisioning can then be performed based on the configurator device 104 sending the CMO to the wireless device 102.

In task 4, the communications link between the configurator device 104 and the wireless device 102 is disconnected.

In task 5, the wireless device 102 discovers and accesses a wireless access node 302 (e.g. a WLAN AP or a Wi-Fi Direct Group Owner) using the newly provisioned parameters based on the CMO. Note that when Wi-Fi Direct is used, the configurator device and the wireless access node may be the same physical device.

The following describes further details of the provisioning operations of task 3.

Task 3 Provisioning Operations According to DPP

The following describes the provisioning operations of task 3 if DPP is used.

Task-3.A1: The configurator device 104 populates the CMO with device provisioning information for the enrollee (the wireless device 102), where the device provisioning information includes any service provider information that is to be used for performing the provisioning. A Wi-Fi Technology field in the CMO is set to a specific value (e.g. "DPP") for indicating that DPP provisioning is to be performed. The Wi-Fi Technology field set to the specific value indicates that the content of the CMO is to be used for DPP provisioning. In some examples, when the "Wi-Fi Technology" field is used in the CMO, a node relating to a provisioning server for Hotspot 2.0 is not used (i.e. the node is omitted). This node is referred to as a "HomeSP node." For Hotspot 2.0 provisioning, the HomeSP node in the CMO includes information elements that are used to discover the provisioning server (e.g. OSU server) for Hotspot 2.0 provisioning.

Task-3.A2: The configurator device 104 transmits the CMO to the enrollee (wireless device 102) using a Configuration Request message.

Task-3.A3: The enrollee receives the CMO and responds to the Configuration Request message by sending to the configurator device 104 a Configuration Response message.

Task-3.A4: The enrollee parses the CMO, detects that the Wi-Fi Technology field is set to "DPP" and that the HomeSP node is not present in the CMO. In response to the foregoing, the enrollee uses the content of the CMO for populating its device policy according to DPP, which effectively provisions the enrollee.

Task-3.A5: The provisioned enrollee transmits a Configuration Confirm message to the configurator device 104 indicating successful provisioning of the enrollee and indicating an imminent disconnect from the configurator device 104. The configurator device 104 may respond acknowledging that the configurator device 104 has received the Configuration Confirm message from the provisioned enrollee. If the enrollee was not successfully provisioned, the enrollee can also transmit a Configuration Confirm message to the configurator device 104 indicating an error status and any associated information.

The Configuration Confirm message is described further below.

Task 3 Provisioning Operations According to Hotspot 2.0

The following describes the provisioning operations of task 3 if Hotspot 2.0 is used.

Task-3.B1: The configurator device 104 (acting like an OSU server, in other words a provisioning entity) populates the CMO with Hotspot 2.0 provisioning information for the Hotspot 2.0 wireless device 102. The provisioning information can include any service provider information that is to be used. The Wi-Fi Technology field is omitted from the CMO, and the HomeSP node is included in the CMO.

Task-3.B2: The configurator device 104 transmits the CMO to the wireless device 102 using a Configuration Request message.

Task-3.B3: The wireless device 102 receives the CMO and responds to the configurator device 104 with a Configuration Response message.

Task-3.B4: The wireless device 102 parses the CMO, detects that the HomeSP node is present and that the Wi-Fi Technology field is not present, and as a result, the wireless device 102 uses the content of the CMO for populating its Hotspot 2.0 policy, which effectively provisions the wireless device 102.

Task-3.B5: The provisioned wireless device 102 transmits a Configuration Confirm message to the configurator device 104 indicating successful provisioning and indicating an imminent disconnect from the configurator device 104. The configurator device 104 may respond by acknowledging that the configurator device 104 has received the Configuration Confirm message from the provisioned wireless device 102. If the wireless device 102 was not successfully provisioned, the wireless device 102 can also transmit a Configuration Confirm message to the configurator device 104 indicating an error status and any associated information.

Provisioning a DPP Configurator

A DPP wireless device can be configured to either have an enrollee role and/or a configurator role. Therefore, in addition to the configurator device 104 provisioning a DPP wireless device as an enrollee (as discussed above), the configurator device 104 can also provision a DPP wireless device as a new configurator.

The CMO can include information to support the provisioning of a DPP wireless device as a configurator. To perform provisioning of a DPP configurator, the tasks of FIG. 3 are as follows.

Tasks 1 and 2 of FIG. 3 are the same as discussed further above.

The following are operations according to task 3 for configuring the wireless device 102 as a DPP configurator.

Task-3.1: Either the configurator device 104 (Configurator A) or the enrollee (the wireless device 102) sends a message to the other that the enrollee is ready to become a DPP configurator (Configurator B).

Task-3.2: The configurator device 104 populates the CMO with a Configurator B policy. The Configurator B policy includes information and parameters suitable for a configurator device, for example this policy may be a copy of the original configurator's policy. The policy may also contain a list of known enrollee devices—Name, Type, Identity Keys, Expire—which were under the control of the original configurator, but are now been re-assigned to Configurator B. The Wi-Fi Technology field in the CMO is set to "DPP," indicating that the content of the CMO is to be used for DPP provisioning. When Wi-Fi Technology field is included in the CMO, the HomeSP node is omitted.

Task-3.3: The configurator device 104 transmits the CMO to the enrollee using a Configuration Request message. (Note that traditionally the DPP configuration exchange is initiated only by the enrollee).

Task-3.4: The enrollee receives the CMO and responds to the configurator device 104 with a Configuration Response message.

Task-3.5: The enrollee parses the CMO, detects that the Wi-Fi Technology field is set to "DPP" and that the HomeSP node is not present in the CMO, and as a result, the enrollee uses the content of the CMO for populating its device policy as Configurator B according to DPP provisioning.

Task-3.6: The enrollee transmits a Configuration Confirm message to the configurator device 104 indicating successful provisioning and indicating an imminent disconnect from the configurator device 104. The configurator device 104 may respond acknowledging that the configurator device 104 has received the Configuration Confirm message from the enrollee.

Task 4: The communications link is disconnected.

Task 5: The new Configurator B can now operate as a DPP configurator device.

Generic Provisioning

In addition to supporting provisioning, based on use of a CMO according to some implementations, according Hotspot 2.0 mobiles or DPP, it is noted that the CMO according to further implementations can also support provisioning according to other wireless technologies, including NAN and others.

More generally, the Wi-Fi Technology field (or other predefined field) in a CMO can be set to any appropriate value for supporting provisioning according to the other wireless technologies.

The configurator device 104 can provision different types of policies associated with different wireless technologies (e.g. P2P policy to perform wireless communications according to Wi-Fi Direct, NAN policy to perform wireless communications using a NA, or infrastructure policy to perform wireless communications using infrastructure nodes such as APs). The use of an extensible policy object in the form of the CMO allows a diverse set of policies to be transmitted from the configurator device 104 and simplifies the parsing performed by wireless devices.

In further implementations, the CMO can be used to synchronize information between configurators and enrollees for subscription remediation (e.g. updates). For example, if a new enrollee is added to a group, the configurator can synchronize an updated enrollee list (a list of enrollees in the group) with other configurators in the area. Also, if a new configurator is added to a local area, the provisioning configurator can synchronize an updated configurator list (a list of configurators in the local area) with other configurators.

In additional implementations, communications according to DPP can occur over an Internet Protocol (IP) IP network. The CMO can provide a way to abstract management information.

Communications according to tasks 1-5 in FIG. 3 do not have to involve communications over a WLAN. Any form of a communications link can be used for DPP bootstrapping and provisioning, for example. The CMO can be used at an application level (e.g. a configurator application on an AP-type device and a configurator client application on a wireless device) to enable the provisioning of legacy equipment.

Common Managed Object (CMO)

The following describes details of a CMO according to some examples. The CMO includes new nodes and fields (in addition to those used in a Hotspot 2.0 MO) for DPP provisioning or provisioning according to other wireless technologies (such as NAN).

Figure 4A:
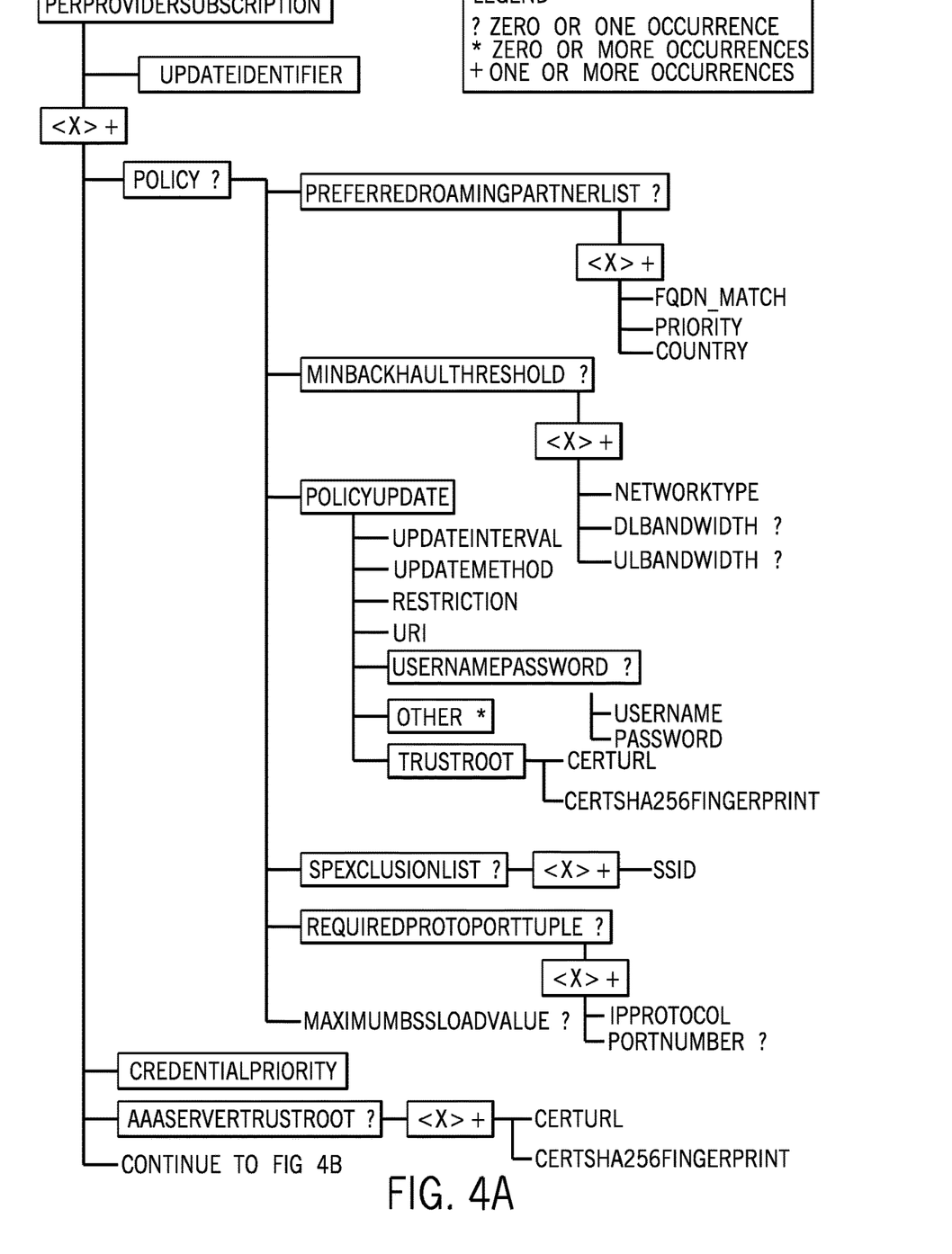
FIGS. 4A-4C illustrate an example common managed object (CMO) according to some implementations.
Figure 4B:
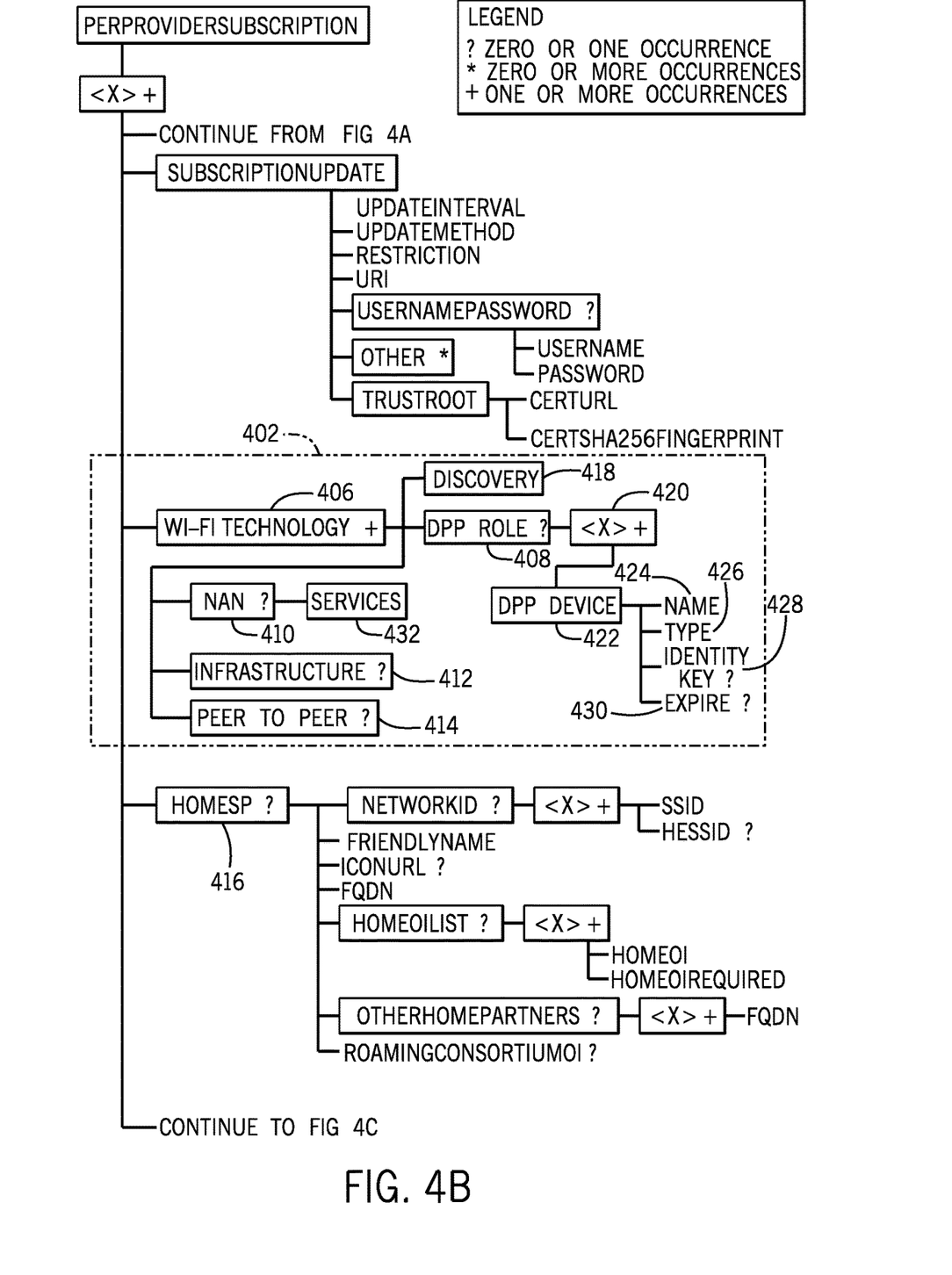
Figure 4C:
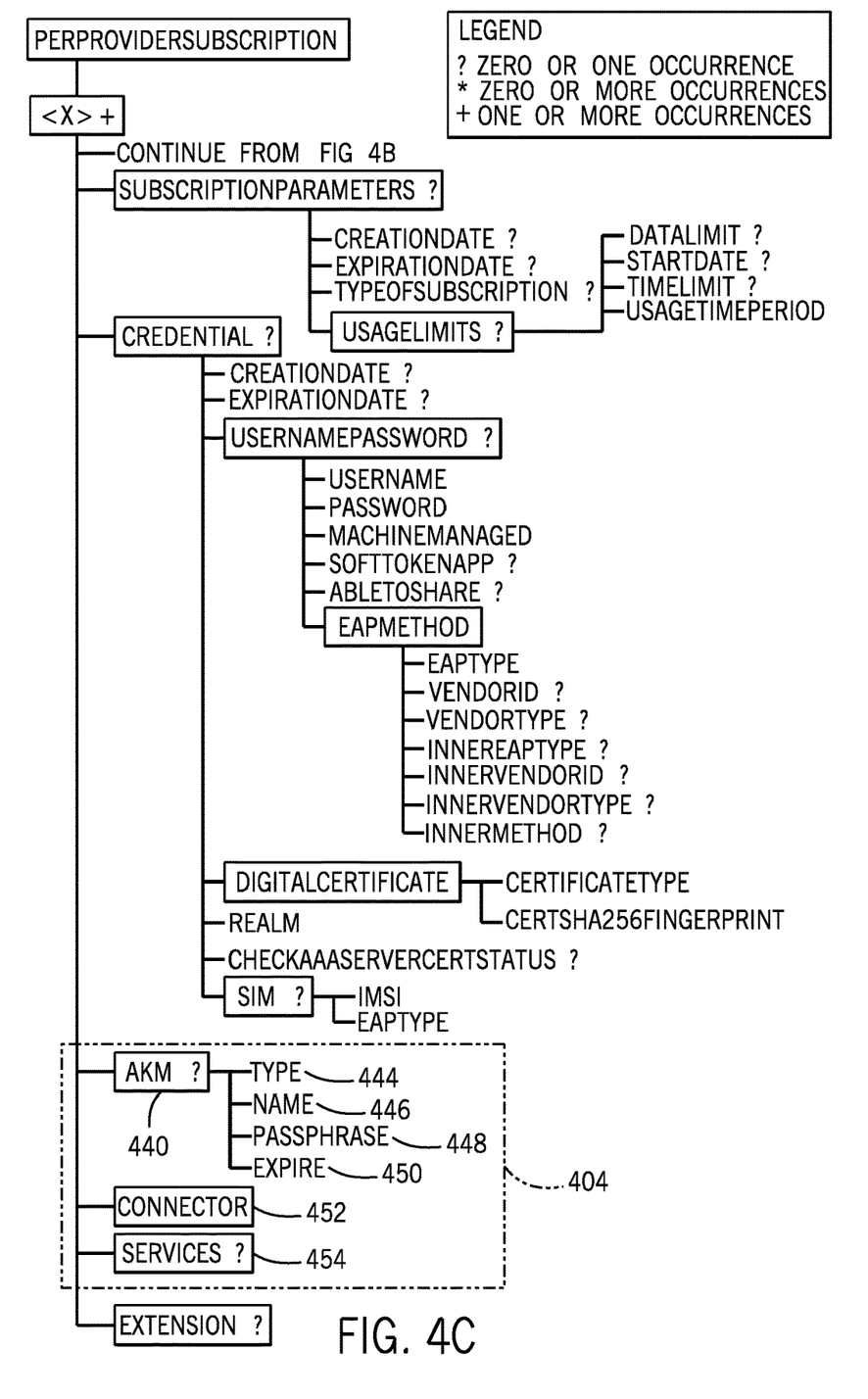

FIGS. 4A-4C illustrate various nodes and fields (nodes and fields are more generally referred to as "information elements") of a CMO according to some examples. Nodes and fields in the CMO of FIGS. 4A-4C that are new (i.e. in addition to those used in a Hotspot 2.0 MO as defined according to the OMA Mobile Terminal Management Tree and Descriptions Specification) are marked in dashed boxes 402 and 404. The remaining nodes and fields (those outside the boxes 402 and 404) in the CMO of FIGS. 4A-4C are defined according to the OMA Mobile Terminal Management Tree and Descriptions Specification.

In some examples, the CMO can be transmitted as either an additional or replacement field within a DPP Configuration Request or Configuration Response message.

In the CMO, some nodes and fields are marked with one of the following legends: ?, *, +. The legend ? indicates that there is zero or one occurrence of the node or field. The legend * indicates that there is (are) zero or more occurrences of the node or field. The legend + indicates that there is (are) one or more occurrences of the node or field.

The new nodes and fields for DPP (and other additional WLAN technologies) in the CMO are described below.

The Wi-Fi Technology node 406 in the CMO can have the following properties.
PerProviderSubscription/<X+>/Wi-Fi Technology

| Status | Occurrence | Format | Access Types |
|---|---|---|---|
| Required | ZeroOrMore | Node | Add, Delete, Get, Replace |

The Status element can be provided for each of the nodes in the CMO. The Status element indicates whether or not a wireless device/enrollee has to support the node. If the Status element is set to "Required," then the wireless device/enrollee has to support the node, provided the parent node of this node is supported. If the Status element is set to "Optional," then a wireless device/enrollee does not have to support the node.

The optional Wi-Fi Technology node 406 identifies the Wi-Fi Technology of the policy that is to be provisioned within the wireless device (except a Hotspot 2.0 wireless device) that receives the CMO.

The Wi-Fi Technology node 406 can have one of the following leaf nodes:
DPP Role node 408,
Peer to Peer (P2P) node 410,
Infrastructure node 412,
NAN node 414.

For example, if the DPP Role node 408 is used, then the provisioning policy is for DPP. The DPP Role node 408 when used in the CMO causes enrollees to be provisioned according to DPP. In this case the HomeSP node 416 is not used.

Each of the foregoing nodes 408, 410, 412, and 414 can have a node structure beneath it, defining specific options for the respective Wi-Fi Technology. This enables the CMO to be used independently of the Wi-Fi Technology type.

It is assumed that if the Wi-Fi Technology node 406 is not used (i.e. omitted from the CMO), then the HomeSP node 416 is used to provide backward compatibility with Hotspot 2.0. If the HomeSP node 416 is included in the CMO, a wireless device receiving the CMO can be provisioned according to Hotspot 2.0.

The transmitting device (e.g. the configurator device 104) can set the value of Wi-Fi Technology node 406 depending on the Wi-Fi Technology that is in operation between the enrollee and the configurator device 104. It is assumed that this is determined by the configurator device 104 during its initial handshake or is configured by an out of band process.

The receiving device (the device receiving the CMO) reads the value of Wi-Fi Technology node 406 and determines the type of provisioning that the receiving device is to use.

The Wi-Fi Technology node 406 also has another leaf node referred to as a Discovery node 418. The Discovery node 418 can have the following properties.
PerProviderSubscription/<X+>/Wi-Fi Technology/Discovery

| Status | Occurrence | Format | Access Types |
|---|---|---|---|
| Required | One | Node | Add, Delete, Get, Replace |

The Discovery leaf node 418 contains optional operating/discovery information such as service set identifier (SSID), operating channel, and operating frequency band.

The transmitting device can set the value of the Discovery leaf node 418 node to the values of a Wi-Fi network (e.g. SSID and channel) that is to be provisioned within the wireless device that receives the CMO.

The receiving device reads the value of the Discovery leaf node 418 and provisions the Wi-Fi network information.

The DPP Role node 408 can have the following properties.
PerProviderSubscription/<X+>/Wi-Fi Technology/DPP Role

| Status | Occurrence | Format | Access Types |
|---|---|---|---|
| Optional | ZeroOrOne | Chr | Add, Delete, Get, Replace |

The DPP Role node 408 identifies the resulting type of DPP device that is being provisioned by the CMO. The DPP Role node 408 can have at least one of the following values:
Enrollee
The DPP Role node 408 contains a list of devices, which are the Name, Type, Identity Key and Expire parameters of all previously used configurators.
Configurator
The DPP Role node 408 contains a list of devices, which are the Name, Type, Identity Key and Expire parameters of all previously provisioned enrollees. This is so a newly provisioned configurator can inherit all the previously provisioned enrollees from another configurator.

The transmitting device can set the value of the DPP Role node 408 to a respective type for a DPP client device. The receiving device reads the value of the DPP Role node 408 and provisions itself as either an enrollee or a configurator.

The DPP Role node 408 has a leaf <X> node 420 that can have the following properties.
PerProviderSubscription/<X+>/Wi-Fi Technology/DPP Role/<X+>

| Status | Occurrence | Format | Access Types |
|---|---|---|---|
| Required | OneOrMore | Node | Add, Delete, Get, Replace |

The <X> node 420 is a container for a list in the DPP device node 422, which can have the following properties.
PerProviderSubscription/<X+>/Wi-Fi Technology/DPP Role/<X+>/DPP device

| Status | Occurrence | Format | Access Types |
|---|---|---|---|
| Required | OneOrMore | Node | Add, Delete, Get, Replace |

The DPP device node 422 is a container for a DPP client device, and includes the following leaf nodes: Name node 424, Type node 426, Identity Key node 428, and Expire node 430.

The Name node 424 includes a device name and can have the following properties. The transmitting device can set the value of the Name node 424 to the name for a client device.
PerProviderSubscription/<X+>/Wi-Fi Technology/DPP Role/<X+>/DPP device/Name

| Status | Occurrence | Format | Access Types |
|---|---|---|---|
| Optional | ZeroOrMore | Chr | Add, Delete, Get, Replace |

The receiving device reads the value of the Name node 424 and provisions the name. If the Name node 424 is not present, the client device may create its own name, if appropriate.

The Type node 426 defines a DPP client device type and can have the following properties.
PerProviderSubscription/<X+>/Wi-Fi Technology/DPP Role/<X+>/DPP device/Type

| Status | Occurrence | Format | Access Types |
|---|---|---|---|
| Required | OneOrMore | Chr | Add, Delete, Get, Replace |

The Type node 426 is a free format string or an enumerated list: STA, AP, Group Owner (GO), Soft AP, etc. The transmitting device can set the value of the Type node 426 to the type for a client device, as determined by the DPP or by an out of band technique.

The receiving device reads the value of the Type node 426 and provisions the type of the receiving device.

The Identity Key node 428 defines a DPP device Identity Key and can have the following properties.
PerProviderSubscription/<X+>/Wi-Fi Technology/DPP Role/<X+>/DPP device/Identity Key

| Status | Occurrence | Format | Access Types |
|---|---|---|---|
| Required | OneOrMore | Chr | Add, Delete, Get, Replace |

The Identity Key node 428 can be a free format string.

The transmitting device can set the value of the Identity Key node 428 to the Identity Key for a client device, as determined by the DPP or by an out of band technique.

The receiving device reads the value of the Identity Key node 428 and provisions the Identity Key.

The Expire node 430 defines the expiry date of the information within the DPP device node 422, and can have the following properties.
PerProviderSubscription/<X+>/Wi-Fi Technology/DPP Role/<X+>/DPP device/Expire

| Status | Occurrence | Format | Access Types |
|---|---|---|---|
| Optional | ZeroOrOne | Node | Add, Delete, Get, Replace |

After the expiry date, the information in the DPP device node 422 may be updated by the DPP configurator (e.g. a further connection between an enrollee and a configurator is established), by a manual update on the DPP client device, or by an out of band technique.

In some examples, the date and time of the Expire node 430 is formatted as YYYY-MM-DDTHH:MM:SSZ as per ISO 8601 (i.e. definition of combined date and time in UTC) where:
YYYY is four digits for the year,
MM is two digits for the month, ranging from 01 to 12,
DD is two digits for the day of the month, ranging from 01 to 31,
HH is two digits for the hour of the day (24-hour clock), ranging from 00 to 23,
MM is two digits for the minute of the hour, ranging from 00 to 59,
SS is two digits for the second of the minute, ranging from 00 to 59.

An example date and time is "2016-04-91T08:53:14Z."

The transmitting device can set the value of the Expire node 430 to an expiry date determined by the DPP or by an out of band technique.

The receiving device reads the value of the Expire node 430 and provisions the expiry date. If there is no value in the Expire node 430, then it is assumed that there is no expiry date for the information in the DPP device node 422.

The Peer to Peer node 414 is a container for nodes and fields specifically for P2P device provisioning, and can have the following properties.
PerProviderSubscription/<X+>/Wi-Fi Technology/Peer to Peer

| Status | Occurrence | Format | Access Types |
|---|---|---|---|
| Optional | ZeroOrOne | Node | Add, Delete, Get, Replace |

The transmitting device can set the value of the Peer to Peer node 414 when a P2P device is to be provisioned. The receiving device reads the value of the Peer to Peer node 414 and provisions itself as a P2P device or a P2P services device. A P2P services device is similar to a P2P device, except that the P2P device is configured with a specific service.

The NAN node 410 is a container for nodes and fields specifically for NAN device provisioning, and has the following properties.
PerProviderSubscription/<X+>/Wi-Fi Technology/NAN

| Status | Occurrence | Format | Access Types |
|---|---|---|---|
| Optional | ZeroOrOne | Node | Add, Delete, Get, Replace |

The transmitting device can set the value of the NAN node 410 when a NAN device is to be provisioned. The receiving device reads the value of the NAN node 410 and provisions itself as a NAN device.

The NAN node 410 has a leaf Services node 432, which is a container for a NAN service or a list of NAN services. The Services node 432 can have the following properties.
PerProviderSubscription/<X+>/Wi-Fi Technology/NAN/Services

| Status | Occurrence | Format | Access Types |
|---|---|---|---|
| Optional | ZeroOrMore | Node | Add, Delete, Get, Replace |

The transmitting device can set the value of the Services node 432 when a NAN service or a list of NAN services is/are to be provisioned. The receiving device reads the value of the Services node 432 and provisions the NAN service or NAN services. This informs the receiving device that upon connection to the Wi-Fi NAN network, these services are available.

The Infrastructure node 412 is a container for nodes and fields specifically for infrastructure (i.e. Wi-Fi infrastructure) device provisioning, and can have the following properties.

PerProviderSubscription/<X+>/Wi-Fi Technology/Infrastructure

| Status | Occurrence | Format | Access Types |
|---|---|---|---|
| Optional | ZeroOrOne | Node | Add, Delete, Get, Replace |

The transmitting device can set the value of the Infrastructure node 412 when an infrastructure device is to be provisioned. The receiving device reads the value of the Infrastructure node 412 and provisions itself as an infrastructure device.

The AKM node 440 is a container node that identifies the authentication and key management (AKM) scheme information, which is used by the respective Wi-Fi Technology. The AKM node 440 can have the following properties.

PerProviderSubscription/<X+>/AKM

| Status | Occurrence | Format | Access Types |
|---|---|---|---|
| Optional | ZeroOrMore | Chr | Add, Delete, Get, Replace |

When the Wi-Fi Technology node 406 is not used (i.e. for Hotspot 2.0 backward compatibility), the AKM node 440 is also not used and the Credential node 442 is used instead.

The AKM node 440 has the following leaf nodes: Type node 444, Name node 446, Passphrase node 448, and Expire node 450. The Type node 444 identifies the type of AKM that is used, e.g. pre-shared key, pairwise master key, etc. The Type node 444 can have the following properties.

PerProviderSubscription/<X+>/AKM/Type

| Status | Occurrence | Format | Access Types |
|---|---|---|---|
| Required | OneOrMore | Chr | Add, Delete, Get, Replace |

The transmitting device can set the value of the AKM node 440 to a value determined by the DPP or by an out of band technique. The receiving device reads the value of the AKM node 440 and provisions the type indicated.

The Name node 446 is the name of the AKM that is used, and can have the following properties.

PerProviderSubscription/<X+>/AKM/Name

| Status | Occurrence | Format | Access Types |
|---|---|---|---|
| Optional | ZeroOrMore | Chr | Add, Delete, Get, Replace |

The transmitting device can set the value of the Name node 446 to the AKM name for a client device. The receiving device reads the value of the Name node 446 and provisions the AKM name. If the leaf node is not present, the client device may create its own name, if appropriate.

The Passphrase node 448 identifies the AKM Passphrase that is provisioned on the client device. The Passphrase node 448 can be a free format string, and can have the following properties.

PerProviderSubscription/<X+>/AKM/Passphrase

| Status | Occurrence | Format | Access Types |
|---|---|---|---|
| Required | OneOrMore | Chr | Add, Delete, Get, Replace |

The transmitting device can set the value of this node to the required AKM passphrase for a client device.

The receiving device reads the value of the Passphrase node 448 and provisions the AKM passphrase. If the Passphrase node 448 is not present, the client device may create its own passphrase, if appropriate.

The Expire node 450 defines the expiry date of the information in the AKM node 440, and can have the following properties.

PerProviderSubscription/<X+>/AKM/Expire

| Status | Occurrence | Format | Access Types |
|---|---|---|---|
| Optional | ZeroOrMore | Chr | Add, Delete, Get, Replace |

After the expiry date specified in the Expire node 450, the information in the AKM node 440 may be updated by the configurator (e.g. a further connection between an enrollee and a configurator is established), by a manual update on the client device, or by an out of band technique.

The date and time of the Expire node 450 can be formatted as YYYY-MM-DDTHH:MM:SSZ as per ISO 8601 (i.e. definition of combined date and time in UTC) where:

YYYY is four digits for the year,

MM is two digits for the month, ranging from 01 to 12,

DD is two digits for the day of the month, ranging from 01 to 31,

HH is two digits for the hour of the day (24-hour clock), ranging from 00 to 23, MM is two digits for the minute of the hour, ranging from 00 to 59, SS is two digits for the second of the minute, ranging from 00 to 59.

An example date and time is "2016-04-91T08:53:14Z."

The transmitting device can set the value of the Expire node 450 to an expiry date determined by the provisioning protocol or by an out of band technique. The receiving device reads the value of the Expire node 450 and provisions the expire date. If there is no Expiry value, then it is assumed that there is no expiry date for the information in the AKM node 440.

The Connector node 452 is a container for a DPP Connector, which is a tuple of a network identifier, a device identifier, and a netKey, all signed by the configurator. The Connector node 452 can have the following properties.

PerProviderSubscription/<X+>/Connector

| Status | Occurrence | Format | Access Types |
|---|---|---|---|
| Optional | ZeroOrMore | Node | Add, Delete, Get, Replace |

The netKey can be in ASN.1 format. The Connector node 452 maps to a DPP Connector type described in the DPP specification.

The transmitting device can set the value of the Connector node 452 to the proposed device identifier and information about the Wi-Fi network (e.g. SSID and channel) that is to be provisioned within the client device. These values are determined by the DPP or by an out of band technique The receiving device reads the value of the Connector node 452 and provisions the device and Wi-Fi network information.

The Services node 454 is a container for a service or a list of services, and can have the following properties.
PerProviderSubscription/<X+>/Services

| Status | Occurrence | Format | Access Types |
|---|---|---|---|
| Optional | ZeroOrMore | Node | Add, Delete, Get, Replace |

The transmitting device can set the value of the Services node 454 when a service or a list of services is/are to be provisioned. The receiving device reads the value of the Services node 454 and provisions the service or services. This informs the receiving device that upon connection to the Wi-Fi network, these services are available.

Configuration Confirm Message

As discussed above, a wireless device 102 that has been provisioned using a CMO can transmit a Configuration Confirm message to the configurator device 104 to indicate successful provisioning. A wireless device 102 that was not correctly provisioned can also transmit a Configuration Confirm message to the configurator device 104 indicating an error status and any associated information.

Note that the Configuration Confirm message is a new message not currently defined by the DPP Specification.

In some examples, the Configuration Confirm message uses the DPP action frame format and is transmitted by a DPP configurator to a DPP enrollee possibly in response to Configuration Response message.

In the DPP Configuration Response message, the Dialog Token field can be set to a nonzero value to identify the original request/response transaction.

The attributes for a DPP Information Element (IE) that is included in the Configuration Confirm message are shown in the table below.

Attributes in the Configuration Confirm Frame

| Attribute | R/O/C | Notes |
|---|---|---|
| Status | R | status code |
| Configuration Confirm Data | R | This field contains information about any issues with the provisioning process within the enrollee. |

The Status attribute can be set to a first value to indicate successful provisioning of the wireless device 102, and can be set to a second value to indicate unsuccessful provisioning. The Configuration Confirm Data attribute can include more specific information regarding the issue(s) encountered during the provisioning.

System Architecture

Figure 5:
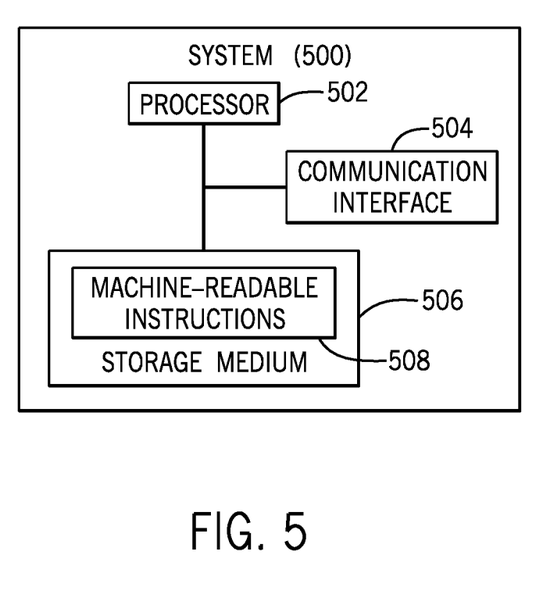
FIG. 5 is a block diagram of an example system 500 according to some implementations.

FIG. 5 is a block diagram of a system 500 according to some implementations. The system 500 can be the wireless device 102, the configurator device 104, or any other device that can perform tasks according to the present disclosure. The system 500 includes a processor (or multiple processors) 502, which can be coupled to a communication interface 504 (e.g. wireless interface) to communicate with another device. A processor can include a microprocessor, a microcontroller, a programmable integrated circuit, a programmable gate array, or another hardware processing circuit.

The system 500 further includes a non-transitory machine-readable or computer-readable storage medium (or storage media) 506, which stores machine-readable instructions 508 that are executable to perform various tasks as described herein.

The storage medium 506 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    sending, by a wireless device to a configurator device, information indicating a Wi-Fi technology that the wireless device supports;
    receiving, by the wireless device from the configurator device that has a wireless interface, a managed object comprising a Wi-Fi technology field included in the managed object by the configurator device, the Wi-Fi technology field set to a value of different values to indicate the Wi-Fi technology that is to be provisioned, the different values selected from a group consisting of a value for a Device Provisioning Protocol (DPP) technology, and a value for a Neighbor Awareness Networking (NAN) technology, wherein the managed object is wirelessly received over an authenticated link between the configurator device and the wireless device; and
    performing, by the wireless device, provisioning of the wireless device according to the value of the Wi-Fi technology field indicated by the managed object.

2. The method of claim 1, wherein a collection of one or more information elements populated in the managed object by the configurator device depends upon a determination by the configurator device of which of different Wi-Fi technologies to use for provisioning the wireless device, where different collections of information elements correspond to the different Wi-Fi technologies.

3. The method of claim 2, wherein the different collections of information elements comprise a first collection of one or more information elements for Hotspot 2.0 provisioning, and a second collection of one or more information elements for DPP provisioning.

4. The method of claim 1, wherein the Wi-Fi technology indicated by the managed object causes provisioning of the wireless device in a transparent manner to a fixed network provisioning infrastructure.

5. The method of claim 1, wherein the provisioning performed by the wireless device provisions the wireless device as a DPP enrollee.

6. The method of claim 1, wherein the provisioning performed by the wireless device provisions the wireless device as a DPP configurator, and the managed object includes information relating to a configurator policy.

7. The method of claim 1, wherein the managed object is to cause provisioning of the wireless device as one of an enrollee, a configurator, a P2P client, a P2P services client, an NAN device, and an access point (AP) with wireless links with one or more APs.

8. A configurator device comprising:
a wireless interface to communicate wirelessly with a wireless device; and
at least one hardware processor configured to:
receive information from the wireless device, wherein the received information indicates a Wi-Fi technology that the wireless device supports;
in response to the received information, include, in a managed object, a Wi-Fi technology field set to a value of different values to indicate the Wi-Fi technology that is to be provisioned, the different values selected from a group consisting of a value for a Device Provisioning Protocol (DPP) technology, and a value for a Neighbor Awareness Networking (NAN) technology; and
cause sending of the managed object to the wireless device to cause the wireless device to perform provisioning according to the value of the Wi-Fi technology field indicated by the managed object.

9. The configurator device of claim 8, wherein the at least one hardware processor is configured to exclude the Wi-Fi technology field from the managed object in response to the received information indicating that the Wi-Fi technology is a Hotspot 2.0 technology.

10. The configurator device of claim 8, wherein the managed object is to cause provisioning of the wireless device as one of an enrollee, a configurator, a P2P client, a P2P services client, an NAN device, and an access point (AP) with wireless links with one or more APs.

11. The configurator device of claim 8, wherein the managed object includes a further information element to specify a role of the wireless device, the role selected from among a DPP role, an infrastructure role, a P2P role, an NAN role, and a role of an access point (AP) with wireless links with one or more APs.

12. The configurator device of claim 8, wherein the at least one hardware processor is configured to include, in the managed object, an information element relating to authentication and key management.

13. The configurator device of claim 8, wherein the at least one hardware processor is configured to include, in the managed object, a further information element including information identifying enrollee devices that have been previously provisioned, the further information element to pass, to the wireless device being provisioned as a configurator, the information identifying the enrollee devices.

14. A non-transitory machine-readable storage medium storing instructions that upon execution cause a configurator device to:
receive information from a wireless device, wherein the received information Indicates a Wi-Fi technology that the wireless device supports;
in response to the received information, include, in a managed object, a Wi-Fi technology field set to a value of different values to indicate the Wi-Fi technology that is to be provisioned, the different values selected from a group consisting of a value for a Device Provisioning Protocol (DPP) technology, and a value for a Neighbor Awareness Networking (NAN) technology; and
cause sending of the managed object to the wireless device to cause the wireless device to perform provisioning according to the value of the Wi-Fi technology field indicated by the managed object.

15. The non-transitory machine-readable storage medium of claim 14, wherein the wireless device is to be provisioned as a configurator based on the managed object, and wherein the managed object further includes information identifying enrollee devices provisioned by the configurator device.

16. The non-transitory machine-readable storage medium of claim 14, wherein the managed object is to cause provisioning of the wireless device as one of an enrollee, a configurator, a P2P client, a P2P services client, an NAN device, and an access point (AP) with wireless links with one or more APs.

\* \* \* \* \*